9572X
N. Read,
Railroad Track,
Patented Mar. 31, 1836.
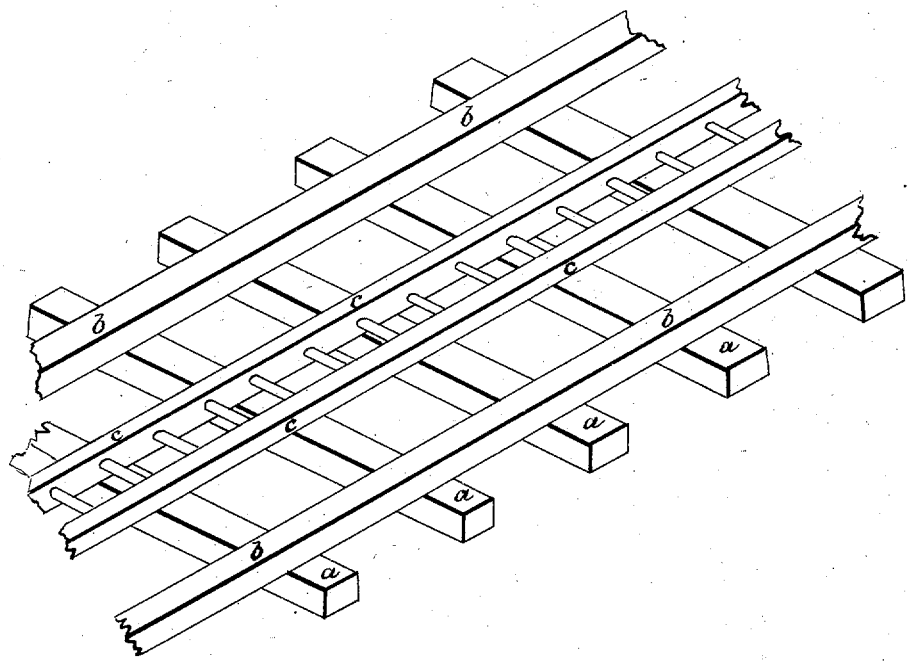
N. PETERS, PHOTO-LITHOGRAPHER, WASHINGTON, D. C.

9572x Mar. 31, 1836

Nathan Read. Belfast: Maine

Letters Patent

The Schedule referred to in these Letters Patent and making part of the same containing a description in the words of the said Nathan Read him self of his improvement in Rail Roads.

To all to whom these Presents shall come. Be it known that I Nathan Read of Belfast in the County of Waldo and State of Maine have invented constructed and applied to use a new and useful improvement in Rail Roads and that the following is my description and specification of the construction and operation of my said improvement viz. I make a rack re sembling a strong ladder which I place between the Rails of the road and on a level with the same [illegible]. This ladder or rack I construct in the following manner. The two side pieces are made of square timber of any suitable kind of wood and of any convenient size, say 6 inches by ten square. These are pla ced at a suitable distance from each other say from 5 to 10 inches. These two side pieces are connected together by stout bars of round iron of sufficient length to enter the side pieces sufficiently to give them permanence and strength and also to keep the side pieces at a proper distance from each other say 6 inches. These bars may be placed from 6 to 9 inches from each other so as to give sufficient space for the action of the long teeth of the cog wheel which is to be attached to the engine or Locomotive which operates on said Rail Road. This cog wheel is placed upon the shaft of the forward wheels of the Locomo tive if necessary a similar one may be placed upon the shaft of the hindmost wheels this wheel is placed midway between the wheels of the Locomotive in such a position that its teeth pass in between the rounds of the rack & push a- gainst them when in operation. The wheel is made of a diameter sufficiently large to effect this. It is made very stout and its teeth larger than common Object of this improvement. The object of this improvement is the following viz. 1st To effect the proper action of the locomotive upon the road in the winter season in those climates where the rails may be encumbered with ice and 9572x Mar 31, 1836

[illegible] and 2nd to effect its unevenhills and elevations. During the winter
in Northern climates. Rail Roads are liable to be clogged with snow or cov-
ed with a crust of ice in such a manner as to greatly hinder or entirely pre-
vent the progress of the Locomotive on the Rails. To prevent the danger of the
Locomotive being thrown from the Rails or retarded in its progress. the lad-
der rack is used being laid & fastened firmly upon the sills or foundation
of the other rails. and the work being open or in other words the rods some-
what distant from each other. the long teeth of the wheel above described
will pass effectually between them & thereby give such firm hold as to enable
the locomotive to progress with its usual strength & speed. In addition to
placing the ladder rack midway between the rails. I attach sometimes when
necessary ladder racks on each side of the road. the rails making one side
of the ladder when the rounds are attached to the rails. it may not always
be necessary to have but one side of the ladder and that side may be the rail
& the teeth will then project in towards the centre of the road in bends or
turns in the road the rounds must be only on one side of the Road.
Reference to the Plates. — Plate 1st Represents the rail road with the lad-
der rack in the middle a. a. the sills of the Road b. b. the rails of the road
c. c. the ladder rack in its place in the road. Plate 2nd Fig 1. Repre-
sents the long toothed wheel which is to play or fit in between the rounds
of the ladder rack Fig. 2. is a representation of the Locomotive in ac-
tion — Claims — What I ~~claim~~ specifically claim as my improve-
ment and for which I ask an exclusive right is. 1st My mode of
constructing a ladder rack and the applying of it to rail Roads & Loco-
motives above described. 2. The application of a wheel as above descri-
bed having longer teeth than have hitherto been used on locomotives
In testimony that the above is a true specification of my said improve-
ment as above described I have hereto set my hand this sixteenth day
of January 1836.

Witnesses
Samuel Davis
Ezekiel Holmes

Nathan Read

Drawings

[illegible]